United States Patent [19]
Fowler et al.

[11] 4,005,997
[45] Feb. 1, 1977

[54] GAS DEHYDRATION WITH LIQUID DESICCANTS AND REGENERATION THEREOF

[75] Inventors: Allan E. Fowler; John E. Protz, both of Lake Jackson, Tex.

[73] Assignee: The Dow Chemical Company, Midland, Mich.

[22] Filed: Feb. 24, 1975

[21] Appl. No.: 552,678

[52] U.S. Cl. .................................. 55/32; 55/84
[51] Int. Cl.² .................................. B01D 53/26
[58] Field of Search ............. 55/29, 31, 32, 83, 84, 55/89

[56] References Cited
UNITED STATES PATENTS

| | | | |
|---|---|---|---|
| 3,349,544 | 10/1967 | Arnold et al. | 55/32 |
| 3,831,346 | 8/1974 | Sharp et al. | 55/32 |
| 3,837,143 | 9/1974 | Sutherland et al. | 55/32 |
| 3,841,382 | 10/1974 | Gravis et al. | 55/32 X |
| 3,867,112 | 2/1975 | Honerkamp et al. | 55/84 X |

*Primary Examiner*—Frank A. Spear, Jr.
*Assistant Examiner*—Ethel R. Cross
*Attorney, Agent, or Firm*—Benjamin G. Colley

[57] ABSTRACT

Natural or industrial gas streams are dehydrated with liquid organic desiccants and the desiccants are treated in a thermal reconcentration zone to remove a major portion of the water contained therein followed by treatment in an isothermal azeotroping zone to remove substantially all the remaining water with low energy requirements.

11 Claims, 2 Drawing Figures

GAS DEHYDRATION WITH LIQUID DESICCANTS AND REGENERATION THEREOF

BACKGROUND OF THE INVENTION

This invention relates to a process for dehydrating a liquid organic desiccant and to a process of using it to increase the dew point depression of a gas stream.

It is known from the patent to Stahl, U.S. Pat. No. 3,105,748, that a liquid desiccant such as triethylene glycol or diethylene glycol can be dehydrated by treating the desiccant with some of the natural gas previously dried by the desiccant. This is called gas stripping. The wet gas is then discharged to the atmosphere or flared with the consequent loss of the valuable fuel and/or energy.

It is also known from the patent to Arnold et al., U.S. Pat. No. 3,349,544, that natural gas can be dried with a liquid desiccant and the desiccant regenerated within an azeotroping zone. However, dew point depression with this system is not as economical as is desired.

SUMMARY OF THE INVENTION

It now has been discovered that the dew point depression of natural gas or industrial gas streams can be lowered to a greater extent with low energy requirement by
a. contacting a moisture laden gas stream with a substantially completely dehydrated liquid organic desiccant in a contacting zone to generate a gas stream having an increased dew point depression and a water rich liquid organic desiccant,
b. heating said water rich liquid organic desiccant from said contactor zone in a thermal reconcentration zone heated to a temperature varying between the boiling point of said water rich desiccant and the decomposition temperature of the pure desiccant whereby a major portion of the water is removed from said liquid desiccant,
c. contacting said partially dried liquid desiccant with a hydrocarbon azeotroping agent which is substantially insoluble in said desiccant and which boils in the range from about 35° to about 235° C. or mixtures thereof, in an azeotroping zone uniformly heated to a temperature in the range from about 5° to about 40° C. below the decomposition temperature of the pure desiccant whereby substantially all the remaining water is removed from said liquid desiccant,
d. recovering a water-hydrocarbon azeotrope,
e. separating the hydrocarbon azeotrope from excess water,
f. recycling said azeotrope to said azeotroping zone,
g. recovering a dehydrated organic desiccant, and
h. recycling said dehydrated desiccant to said contacting zone.

It has further been discovered that the organic desiccant can be dehydrated by
a. heating a water rich liquid organic desiccant from said contactor zone in a thermal reconcentration zone heated to a temperature varying between the boiling point of said water rich desiccant and the decomposition temperature of the pure desiccant whereby a major portion of the water is removed from said liquid desiccant,
b. contacting said partially dried liquid desiccant with a hydrocarbon azeotroping agent which is substantially insoluble in said desiccant and which boils in the range from about 35° to about 235° C. or mixtures thereof in an azeotroping zone uniformly heated to a temperature in the range from about 5° to about 40° C. below the decomposition temperature of the pure desiccant whereby substantially all the remaining water is removed from said liquid desiccant,
c. recovering a water-hydrocarbon azeotrope,
d. separating the hydrocarbon azeotrope from excess water,
e. recycling said azeotrope to said azeotroping zone, and
f. recovering a dehydrated organic desiccant.

DETAILED DESCRIPTION

The process of the present invention is useful for the drying of natural gas streams and industrial gas streams such as hydrogen, ethylene, propylene, cracked gas, synthetic natural gas streams and the like.

The normally liquid desiccants which can be used in the present invention are polyols such as glycols of 2 to 12 carbon atoms, separately or mixtures thereof. Examples of these are ethylene glycol, diethylene glycol, triethylene glycol, tetraethylene glycol, propylene glycol, dipropylene glycol, tripropylene glycol, tetrapropylene glycol and similar butylene glycols.

Other liquid desiccants that can be used in the present invention are polyols such as glycerol, diglycerol, trimethylol propane, 2,2-dimethylol propane, 2,2,2-trimethylol ethane, 1,4-dihydroxy cyclohexane, 1,4-dimethylol cyclohexane, and mixtures thereof.

Still other liquid desiccants that can be used are N-methyl pyrrolidones such as N-methyl pyrrolidone, N-methyl-5-methyl-pyrrolidone and sulfolanes such as tetrahydro thiophene dioxide, dimethyl tetrahydrothiophene dioxide and the like.

The hydrocarbon azeotroping agents which can be used in this invention are alkanes, cycloalkanes, and aromatic hydrocarbons which are substantially insoluble in the desiccant and which have a normal boiling range from about 35° to about 235° C.

Examples of the alkanes are those having straight and branched chains and which have 5–13 carbon atoms such as pentane, hexane, octane as well as dodecane, tridecane and mixtures thereof.

Examples of the cycloalkanes are cyclohexane, dimethyl cyclohexane, trimethylcyclohexane, cycloheptane, cyclooctane, and mixtures thereof.

Examples of the aromatic hydrocarbons are benzene, toluene, xylene, ethylbenzene, cumene, butylbenzene, diethyl benzene, triethyl benzene, and mixtures thereof.

Figure 1:
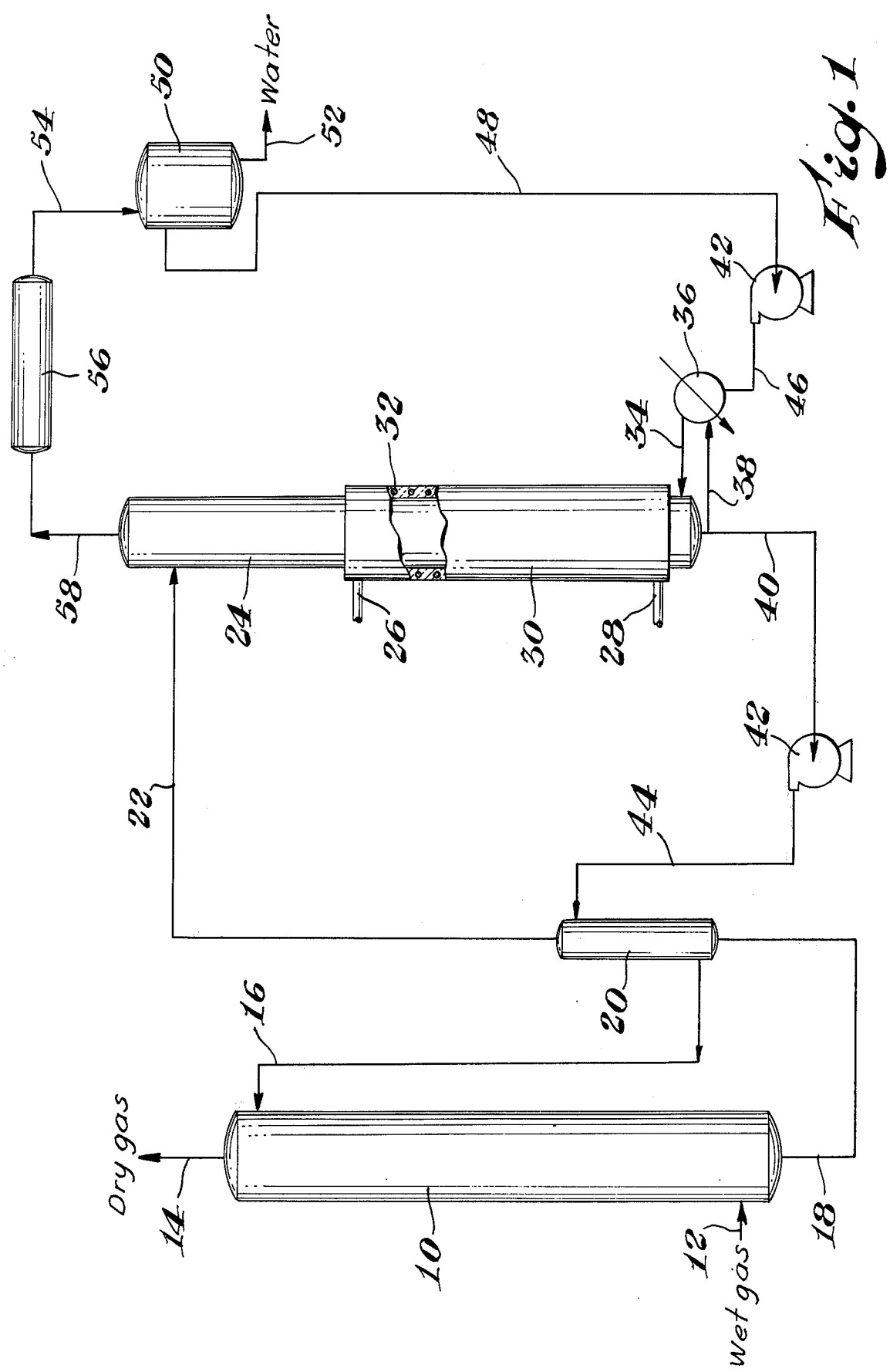
FIG. 1 is a diagrammatic view of the apparatus used in the present invention.

The contactor 10 is a conventional gas-liquid contacting column having an inlet 12 for the wet industrial gas and an outlet 14 for the gas that has been dried. The previously dried or lean liquid desiccant enters the column 10 at the inlet 16 and the water rich desiccant is removed from the outlet 18.

The rich desiccant then flows by line 18 into a heat exchanger 20 where it is heated to a temperature range of about 80° to 180° C. by the hot dry desiccant in line 44 and it flows by the line 22 into the top of thermal reconcentrator column 24 wherein the desiccant is subjected to heating from the hydrocarbon azeotrope passing upwardly therethrough. This removes a major portion or about 90% of the water contained in the desiccant.

The partially dried desiccant then passes downwardly into the uniformly heated azeotroping column 30 wherein substantially all the remaining water is removed. This column 30 is provided with heating coils 32 and insulation jackets (not shown) which when combined with the hot azeotrope vapors passing through insure that the rich desiccant is treated to uniform temperatures in the range from about 5° to about 40° C. below the decomposition temperature of the desiccant for a substantial contact period in which almost all the remainder of the water in the desiccant is removed. Preferably the azeotroping column and/or zone is uniformly heated in the range from about 5° to about 20° C. below the decomposition temperature of the pure desiccant. Highest efficiencies are obtained at about 5° C. below said temperature. The heating coils 32 can be supplied with steam by means of the inlet and outlet 26 and 28 respectively. Other means of heating such as electric coils can be used if it is convenient.

The hot dried desiccant passes out the bottom of the azeotroping column 30 by means of line 40 and is pumped by the pump 42 to the heat exchanger and to the contactor 10 for reuse. A portion of the dried desiccant flows by line 38 to a re-boiler 36 which supplies some of the heat to keep the columns 24 and 30 at the proper temperatures.

In the re-boiler 36 the liquid azeotroping agent is converted to a vapor and this is supplied to the bottom of column 30 by line 34.

The overhead azeotrope vapors leave the column 24 by line 58 to a conventional condensor 56 where they are converted to a liquid which is then led by line 54 to a separator 50. In the separator, excess water is removed and discarded by line 52. The liquid azeotroping agent is then fed by line 48 to the pump 42 and hence to the re-boiler 36 by line 46 for reuse.

Figure 2:
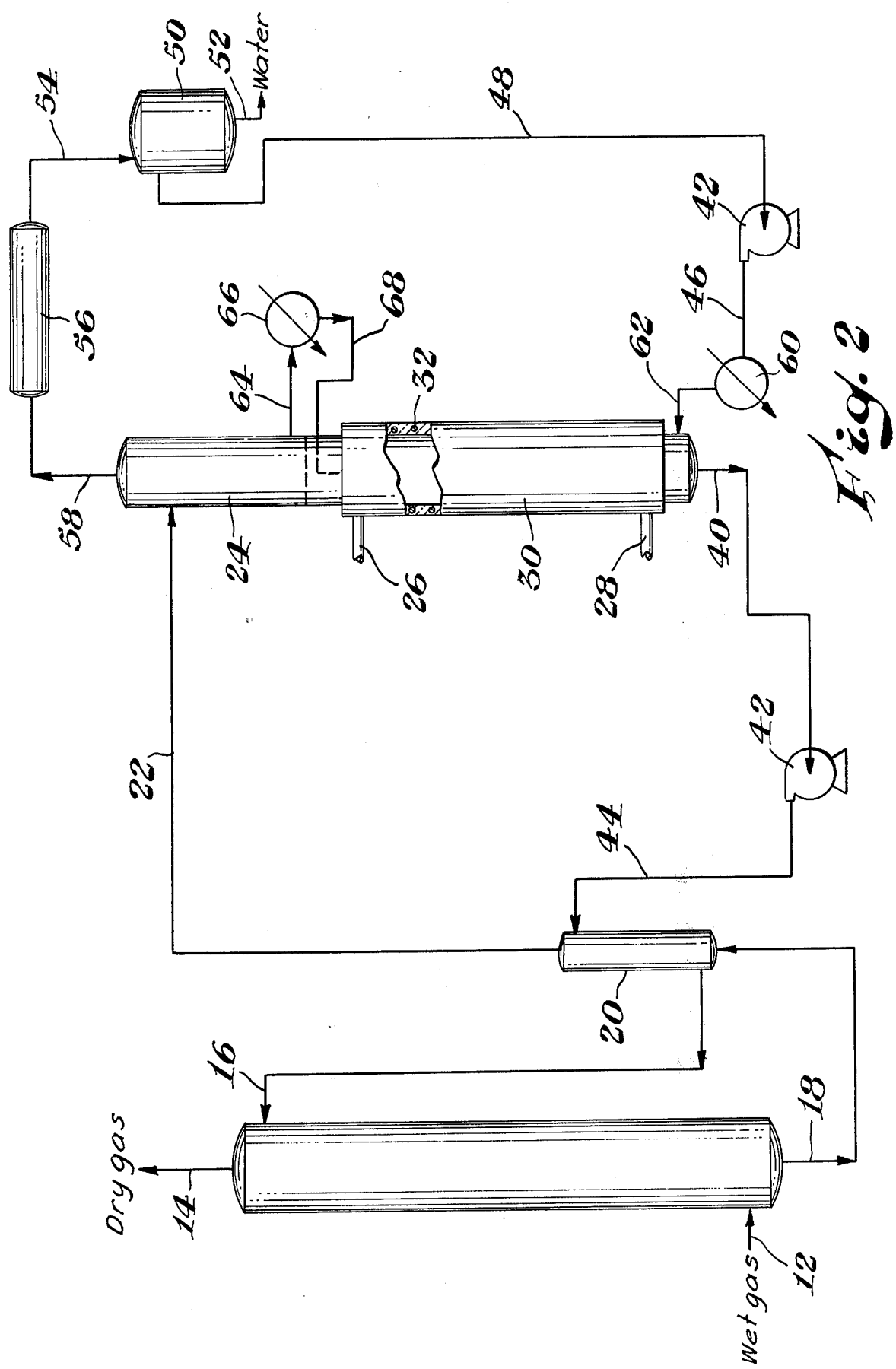
FIG. 2 is similar to FIG. 1 in that a combination of a contactor and a thermal reconcentrator is used.

FIG. 2 is similar to FIG. 1 in that a combination of a contactor 10 and a thermal reconcentrator 24 is used. In this instance, however, the partially dried desiccant is removed by line 64 from the reconcentrator 24 and flows to a re-boiler 66 wherein heat is supplied. The heated desiccant then flows by line 68 to the uniformly heated azeotroping column 30 which is insulated and heated as aforesaid.

A further difference is that a second re-boiler 60 is used to vaporize the liquid azeotroping agent supplied by line 46 and the azeotrope vapor is injected into column 30 by line 62.

For the purposes of this invention the following definitions apply.

An azeotroping agent substantially insoluble in the liquid desiccant means that the azeotroping agent is less than 5% by weight soluble in the desiccant and preferably less than 1% by weight soluble.

A uniformly heated azeotroping zone means that the temperature is maintained as constant as is thermodynamically possible through out the zone i.e. $\pm 4°$ C. from the designed temperature.

The principal advantage of the present process is in utility requirements as is shown below.

The following calculations will yield total duty for the processes wherein the following terms are used:

Qt = Total Process Heat Load (BTU/Hr.)
Qs = Rich Desiccant Sensible Heat (BTU/Hr.)
Qlw = Latent Heat of Vaporization for Water (BTU/Hr.)
Qss = Solvent Sensible Heat (BTU/Hr.)
Qls = Latent Heat of Vaporization for Solvent (BTU/Hr.)
Qr = Reflux Duty (BTU/Hr.)
Ql = Heat Losses (BTU/Hr.)
Qsg = Sensible Heat for Stripping Gas (BTU/Hr.)
Qv = Heating Value of Lost Stripping Gas (BTU/Hr.)
Qcd = Heat Load for Thermal Atmospheric Reconcentration to 98.6% TEG.

A comparison with hot gas stripping and azeotroping will be shown. The total heat load Qt is shown by the following equation.

$$Qt = Qs + Qlw + Qss + Qls + Qr + Ql$$

The assumed plant conditions are:
Inlet gas saturated at 1000 psia and 80° F.
Inlet water content — 34 lb/mmscf
Gas flow rate = 100 mmscfd
Outlet gas = 0.25 lb/mmscf and dew point = approx. −43° F.
Desiccant: triethylene glycol (T.E.G.) circulation rate = 1.2 gal/lb $H_2O$
Lean glycol conc. = 99.95%

In natural gas operations, hot gas stripping is the predominant method for a highly reconcentrated glycol stream. The problem with this process is the loss of valuable stripping gas. This wet gas must be either vented or flared and is lost.

Another method used is based on the use of an azeotroping agent such as toluene as is shown by Arnold et al. in U.S. Pat. No. 3,349,544.

Since the heat required for reconcentration to 98.6% in the re-boiler is the same for all three processes, the advantage comes in the use of an isothermal azeotroping column. Thus, the following duties are involved:

$Qs$ = Glycol sensible heat = (assume feed temp. = 350° F)

$$\frac{1.2 \text{ gal TEG}}{\text{lb } H_2O} \quad \frac{33.75 \text{ lb } H_2O}{\text{mmscf}} \quad \frac{100 \text{ mmscf}}{\text{day}} \quad \frac{9.2 \text{ lb}}{\text{gal TEG}} \quad \frac{0.6 \text{ BTU}}{\text{lb - °F}} \quad \frac{50° \text{ F}}{24 \text{ hr.}} \quad \frac{\text{day}}{}$$

$Qs$ = 46,575 BTU/hr.
$Qss$ = Solvent. Sensible Heat

A lean glycol concentration of 99.95% (500 ppm) will require 0.81 lb isooctane/gal. TEG. This corresponds to 0.14 gal/gal. TEG.

$$Qss = \frac{0.14 \text{ gal.}}{\text{gal TEG}} \quad \frac{5.8 \text{ lb Iso-}C_8}{\text{gal}} \quad \frac{168.75 \text{ gal TEG}}{\text{hr}} \quad \frac{.55 \text{ BTU}}{\text{lb - °F}} \quad 100\%$$

$Qss$ = 7537 BTU/hr.

$Qls$ = Latent Heat of Solvent

-continued $$\frac{0.14 \text{ gal}}{\text{gal TEG}} \quad \frac{5.8 \text{ lb Iso-C}_8}{\text{gal}} \quad \frac{168.75 \text{ gal TEG}}{\text{hr}} \quad \frac{117 \text{ BTU}}{\text{lb}}$$

$Qls = 16{,}032$ BTU/hr.
$Qr =$ Reflux duty $= 0.25\ Qlw = (0.25)\ (136{,}448)$ BTU/hr.)
$= 34{,}112$ BTU/hr.
$Ql =$ Heat Losses $= 10\%$ of $(Qt - Ql)$
$= (0.10)\ (240{,}704$ BTU/hr.$) = 24{,}070$ BTU/hr.

For comparison, the hot gas stripping process will require 10 scf/gal. of TEG for the same water removal. The overall heat duty for this process will be:

$$Qt = Qs + Qlw + Qsg + Qr + Ql + Qv$$

For our plant comparison, the following values apply:

$Qsg =$ Gas Sensible Heat $=$ $$\frac{168.75 \text{ gal TEG}}{\text{hr.}} \quad \frac{10 \text{ scf gas}}{\text{gal. TEG}} \quad \frac{.53 \text{ BTU}}{\text{lb - }°\text{F}} \quad \frac{100° \text{ F}}{} \quad \frac{\text{lb.}}{23.65 \text{ ft.}^3}$$

$Qsg = 3782$ BTU/hr.
$Ql =$ Heat Losses $= 10\%$ of $(Qs + Qlw + Qsg + Qr)$
$Ql = (.10)\ (220{,}917$ BTU/hr.)
$Ql = 22{,}092$ BTU/hr.

$Qv =$ Heating Value of Gas $=$ $$\frac{168.75 \text{ gal TEG}}{\text{hr}} \quad \frac{10 \text{ scf gas}}{\text{gal TEG}} \quad \frac{1000 \text{ BTU}}{\text{ft}^3}$$

Azeotroping Duties with Toluene (Arnold)

$$Qt = Qs + Qlw + Qss + Qls + Qr + Ql$$

$$Qs = 1.2 \text{ gal.} \quad \frac{33.75 \text{ lb H}_2\text{O}}{\text{lb H}_2\text{O}} \quad \frac{100 \text{ mmscf}}{\text{mmscf}} \quad \frac{9.2 \text{ lb}}{\text{Gal TEG}} \quad \frac{0.6 \text{ BTU}}{16° \text{ F.}} \quad \frac{50° \text{ F. day}}{24 \text{ hr.}}$$

$Qs = 46{,}575$ BTU/Hr.

$$Qlw = \frac{33.75 \text{ lb. H}_2\text{O}}{\text{mmscf}} \quad \frac{100 \text{ mmscf}}{\text{Day}} \quad \frac{970.3 \text{ BTU}}{\text{lb}} \quad \frac{\text{Day}}{24 \text{ hr.}}$$

$Qlw = 136{,}448$ BTU/Hr.
$Qss =$ Solvent Sensible Heat.

According to Arnold, et al., a glycol concentration of 99.95% will require 8.27 lb. toluene/gal TEG.

$$Qss = \frac{168.75 \text{ gal TEG}}{\text{Hr.}} \quad \frac{100° \text{ F.}}{} \quad \frac{8.27 \text{ lb. toluene}}{\text{Gal. TEG}} \quad \frac{.45 \text{ BTU}}{\text{lb. - }°\text{F}}$$

$Qss = 62{,}800$ BTU/hr.

$$Qls = \text{Latent Heat} = \frac{1395.6 \text{ lb. Toluene}}{\text{Hr.}} \quad \frac{155 \text{ BTU}}{\text{lb.}}$$

$Qls = 216{,}318$ BTU/hr.
$Qr = 0.25\ (Qlw) = (0.25)\ (136{,}448$ BTU/Hr.)
$Qr = 34{,}112$ BTU/hr.
$Ql =$ Losses $= 10\%$ of $(Qt - Ql)$
$= (0.10)\ (496{,}247) = 49{,}625$ BTU/hr
$Qt = 545{,}872$ BTU/Hr.

The total duties for all three processes are shown in Table I. As shown, the instant process only adds 10% to the initial reconcentration requirements. In terms of residual water removal, the instant process can realize a 69/2 advantage over gas stripping for this case and a 16.5/advantage over the known azeotroping process.

The heat duties of all three processes are further summarized in Table II and the energy savings are pointed out in Table III.

TABLE I

| Variable | Hot Gas Stripping | Present Process | Azeotroping |
|---|---|---|---|
| Inlet Gas Temp. | 80° F | 80° F | 80° F |
| Inlet Gas Press. | 1000 PSIA | 1000 PSIA | 1000 PSIA |
| Outlet Gas Dew Pt. | −43° F | −43° F | −43° F |
| Outlet Gas Water | .25 lb/mmscf | .25 lb/mmscf | .25 lb/mmscf |
| Gas Flow Rate | 100 mmscfd | 100 mmscfd | 100 mscfd |
| Lean Glycol | 99.95% | 99.95% | 99.95% |
| Reboiler Temp. | 400° F | 400° F | 400° F |
| Glycol Circ. | 1.2 gal/lb H$_2$O | 1.2 gal/lb H$_2$O | 1.2 gal./lb.H$_2$O |
| Reconcentrating Agent | Methane | Isooctane | Toluene |
| Solvent Duty | 10 scf/gal. | .81 lb/gal. | 8.27 lb/gal. |
| Total Duty | 1,923,509 BTU/Hr. | 264,774 BTU/Hr. | 545,878 BTU/Hr. |
| Reconcentrating to 98.6% | 241,205 BTU/Hr. | 241,205 BTU/Hr. | 241,205 BTU/Hr. |
| Advantage | — | 7.3 to 1 overall but 71 to 1 for reconcentrating to 99.95% | 2.1 to 1 overall but 12.9 for reconcentration to 99.95% |

TABLE II

| Utility Duty - (BTU/Hr.) | Hot Gas Stripping | Azeotroping Process | Present Process |
|---|---|---|---|
| Glycol Sensible Heat: Qs - Heat from 350–400° F | 46,575 | 46,575 | 46,575 |
| Water Latent Heat: Qlw - Vaporize Water | 136,448 | 136,448 | 135,448 |
| Solvent Sensible Heat: Qss - Heat Liquid From 100° to 200° F | — | 62,800 | 7,537 |

TABLE II-continued

| Utility Duty - (BTU/Hr.) | Hot Gas Stripping | Azeotroping Process | Present Process |
|---|---|---|---|
| Solvent Latent Heat: Qls - Vaporize Solvent | — | 216,318 | 16,032 |
| Reflux Duty: Qr - 25% of Qlw | 34,112 | 34,112 | 34,112 |
| Ql - Heat Losses - 10% of Major Duty | 22,092 | 49,625 | 24,070 |
| Gas Sensible Heat - Qsg - Heat Gas from 100–200° F. | 3,782 | — | — |
| Heating Value of Gas Qv - Value of Lost Gas | 1,687,500 | — | — |
| Total Duty = Qt | 1,923,509 | 545,878 | 264,774 |

TABLE III

| Duties (BTU/Hr) | Gas Stripping | Azeotroping | Present Process |
|---|---|---|---|
| Total Duty Qt | 1,923,509 | 264,774 | 545,878 |
| Thermal Duty Qcd | 241,205 | 241,205 | 241,205 |
| Duty Required for Reconcentration From 98.6% to 99.95% TEG | 1,682,304 | 304,673 | 23,569 |
| Our Advantage | 71 to 1 | 12.9 to 1 | — |
| Our Percent Energy Savings Over Existing Art | 98.6% | 92.3% | — |

The following examples are presented to illustrate but not limit the present invention.

EXAMPLE 1

A solution of aqueous triethylene glycol containing approximately 15% water was fed to an atmospheric adiabatic distillation column at the rate of 900 cc/hr. The reboiler was operated at 400° F. resulting in a continuous stream of reconcentrated glycol of 98.5%. This stream is then fed to an isothermal column and contacted with super-heated isooctane vapors. The column operated at 400° F. under isothermal conditions. The hydrocarbon flow rate was maintained at approximately 0.73 lb. per gallon of circulating glycol. At equilibrium conditions the water content of the lean glycol was 0.08% by weight.

EXAMPLE 2

The conditions of example 1 were duplicated for this run with the exception of the hydrocarbon flow rate using 400° F isothermal contact. A flow rate of approximately 1.09 lb. per gallon of glycol resulted in a lean water content of 0.02 weight percent water.

EXAMPLE 3

Under the same conditions as in Example 1 the hydrocarbon flow rate was increased to approximately 1.35 lb. per gallon of glycol. The resulting lean glycol water content was 0.01 weight percent. This corresponds to a glycol concentration of 99.99%.

EXAMPLE 4

Under the same operating conditions as example 1, natural gas condensate was used as the azeotroping agent. Flow rates of about 1.0 lb. per gallon resulted in a lean glycol concentration of 99.99% or 115 ppm water. The condensate used is typical of rich natural gas streams and consisted of hydrocarbons in the $C_5$–$C_{13}$ range having a boiling point range from about 40° to 250° C.

EXAMPLE 5

Under the same conditions as example 1, hexane was used as azeotroping agent at rates of 1.86 lb/gal of circulating triethylene glycol (TEG). Resultant lean TEG was 99.98%.

EXAMPLE 6

Under the same conditions as example 1, toluene was used at rates of 2.33 lb/gal. of circulating triethylene glycol. Resulting lean glycol (TEG) was 99.991% or 90 ppm water.

EXAMPLE 7

A solution of 8.8% water in DEG (diethylene glycol) was fed to an atmospheric adiabatic distillation column at a rate of 900 cc/hr. The column contained a lower section operated isothermally. At reboiler temperature of 165° C., isooctane was used as the azeotroping agent at rates of 1.45 lb/gal of circulating DEG. Resultant lean glycol concentration was 99.6% or 0.4% water.

EXAMPLE 8

A solution of 9% water in triethylene glycol (TEG) was fed to a column at a rate of 900 cc/hr. The column was fitted with an adiabatic section and an isothermal section. The column operated at 400° F. and atmospheric pressure. Using isooctane as the azeotroping agent throughout the entire column, lean or dry glycol was found to be 99.997% or 30 ppm water at rates of 1.32 lb isooctane/gal. of circulating glycol. Subsequent use of this dry glycol to dry wet gas can result in a dew point of −100° F. or lower.

We claim:

1. The method of increasing the dew point depression of a gas stream using low energy requirements which comprises
   a. contacting a moisture laden gas stream with a substantially completely dehydrated liquid organic desiccant in a contacting zone to generate a gas stream having an increased dew point depression and a water rich liquid organic desiccant, b. heating said water rich liquid organic desiccant from said contactor zone in a thermal reconcentration zone heated to a temperature varying between the boiling point of said water rich desiccant and the decomposition temperature of the pure desiccant whereby a major portion of the water is removed from said liquid desiccant, c. contacting said partially dried liquid desiccant with a hydrocarbon azeotroping agent which is substantially insoluble in said desiccant and which boils in the range from about 35° to about 235° C. or mixtures thereof, in an azeotroping zone uniformly heated to a temperature in the range from about 5° to about 40° C. below the decomposition temperature of the pure desiccant whereby substantially all the remaining water is removed from said liquid desiccant, d. recovering the water-hydrocarbon azeotrope, e. separating the hydrocarbon azeotrope from excess water, f. recycling said azeotrope to said azeotroping zone, g. recovering a dehydrated organic desiccant, and h. recycling said dehydrated desiccant to said contacting zone.

2. The method as set forth in claim 1 wherein the gas stream treated is a natural gas stream.

3. The method as set forth in claim 1 wherein the organic desiccant is a glycol of 2–12 carbon atoms.

4. The method as set forth in claim 3 wherein the glycol used is triethylene glycol.

5. The method as set forth in claim 1 wherein the azeotroping agent is an alkane having a boiling range from about 35° to about 235° C.

6. The method as set forth in claim 5 wherein the azeotroping agent is isooctane.

7. The method of dehydrating a liquid organic desiccant with a hydrocarbon azeotroping agent which desiccant is useful to dehydrate a gas stream in a liquid-gas contactor zone which comprises a. heating a water rich liquid organic desiccant from said contactor zone in a thermal reconcentration zone heated to a temperature varying between the boiling point of said water rich desiccant and the decomposition temperature of the pure desiccant whereby a major portion of the water is removed from said liquid desiccant, b. contacting said partially dried liquid desiccant with a hydrocarbon azeotroping agent which is substantially insoluble in said desiccant and which boils in the range from about 35° to about 235° C. or mixtures thereof in an azeotroping zone uniformly heated to a temperature in the range from about 5° to about 40° C. below the decomposition temperature of the pure desiccant whereby substantially all the remaining water is removed from said liquid desiccant, c. recovering a water-hydrocarbon azeotrope, d. separating the hydrocarbon azeotrope from excess water, e. recycling said azeotrope to said azeotroping zone, and f. recovering a dehydrated organic desiccant.

8. The method as set forth in claim 7 wherein the organic desiccant is a glycol of 2–12 carbon atoms.

9. The method as set forth in claim 8 wherein the glycol used is triethylene glycol.

10. The method as set forth in claim 7 wherein the azeotroping agent is an alkane having a boiling range from about 35° to about 235° C.

11. The method as set forth in claim 10 wherein the azeotroping agent is isooctane.

* * * * *

UNITED STATES PATENT AND TRADEMARK OFFICE
CERTIFICATE OF CORRECTION

PATENT NO. : 4,005,997
DATED : Feb. 1, 1977
INVENTOR(S) : A. E. Fowler & J. E. Protz It is certified that error appears in the above-identified patent and that said Letters Patent are hereby corrected as shown below:

Col. 6, line 37; change "69/2" to --69/1--.

Col. 6, line 38; change "16.5/ advantage" to --16.5/1 advantage--

*Signed and Sealed this*

Third *Day of* May 1977

[SEAL]

Attest:

RUTH C. MASON
*Attesting Officer*

C. MARSHALL DANN
*Commissioner of Patents and Trademarks*

UNITED STATES PATENT AND TRADEMARK OFFICE
CERTIFICATE OF CORRECTION

PATENT NO. : 4,005,997
DATED : Feb. 1, 1977
INVENTOR(S) : A. E. Fowler & J. E. Protz It is certified that error appears in the above-identified patent and that said Letters Patent are hereby corrected as shown below:

Column 4, line 32; change "34 lb/mmscf" to
-- 33.75 lb/mmscf --.

Column 4, line 63; change "100%" to -- 100°F --.

Column 6, Table I, second column; change "1,923,509" to
-- 1,930,509 --.

Column 7, Table II, second column; change "1,923,509" to
-- 1,930,509 --.

Column 7, Table III, second column; change "1,923,509" to
-- 1,930,509 --.

Column 7, Table III, second column; change "1,682,304" to
-- 1,689,304 --.

Signed and Sealed this

Thirtieth Day of May 1978

[SEAL]

Attest:

RUTH C. MASON
Attesting Officer

LUTRELLE F. PARKER
Acting Commissioner of Patents and Trademarks